United States Patent
Hambitzer et al.

(10) Patent No.: US 6,730,441 B1
(45) Date of Patent: May 4, 2004

(54) RECHARGEABLE ELECTROCHEMICAL CELL

(75) Inventors: Günther Hambitzer, Pfinztal (DE); Bernd Kreidler, Pfinztal (DE); Volker Döge, Karlsruhe (DE); Ulrike Dörflinger, Pfinztal (DE); Klaus Schorb, Rheinstetren (DE)

(73) Assignee: Gunther Hambitzer, Pfinztal (DE)

( * ) Notice: Subject to any disclaimer, the term of this patent is extended or adjusted under 35 U.S.C. 154(b) by 290 days.

(21) Appl. No.: 09/926,768

(22) PCT Filed: May 30, 2000

(86) PCT No.: PCT/DE00/01801

§ 371 (c)(1),
(2), (4) Date: Dec. 18, 2001

(87) PCT Pub. No.: WO00/79631

PCT Pub. Date: Dec. 28, 2000

(30) Foreign Application Priority Data

Jun. 18, 1999 (DE) .......................................... 199 27 937

(51) Int. Cl.$^7$ .............................................. H01M 10/36
(52) U.S. Cl. .................... 429/346; 429/199; 429/231.9; 429/231.95
(58) Field of Search ............................ 429/231.95, 199, 429/346, 231.9

(56) References Cited

U.S. PATENT DOCUMENTS 5,213,914 A    5/1993 Heitbaum et al.
5,656,391 A  * 8/1997 Hambitzer et al. ......... 429/162

FOREIGN PATENT DOCUMENTS

| EP | 0357952 A1 | 3/1990 |
| EP | 0615301 A1 | 3/1994 |
| EP | 0672552 B1 | 9/1995 |
| WO | WO 00/44061 A1 | 7/2000 |

OTHER PUBLICATIONS

Handbook of Batteries, David Linden 2 pages.
Journal of Power Sources, (1993) (583–587).
Journal of The Electrochemical Society Dey et al. pp. 2116–2120.

* cited by examiner

*Primary Examiner*—Patrick Ryan
*Assistant Examiner*—Angela J Martin
(74) *Attorney, Agent, or Firm*—Rothwell, Figg, Ernst & Manbeck, P.C.

(57) ABSTRACT

Rechargeable electrochemical cell, with a negative electrode, which in charged state contains an active metal selected from the group of the alkaline metals, the alkaline-earth metals and the metals of the second subgroup of the periodic table of elements; an electrolyte solution based on sulfur dioxide; and a positive electrode containing the active metal, from where ions come out into the electrolyte solution during the charging process.

A self discharge reaction takes place at the negative electrode, for which the sulfur dioxide of the an electrolyte solution reacts with the active metal of the negative electrode to form a poorly soluble compound. According to the invention, the electrochemical charge quantity of the sulfur dioxide in the cell, calculated with one faraday per mole sulfur dioxide, is smaller than the charge amount of the active metal which can be theoretically electrochemically accumulated in the positive electrode.

14 Claims, No Drawings

RECHARGEABLE ELECTROCHEMICAL CELL

The invention relates to a rechargeable electrochemical cell with a negative electrode, which contains—in the charged state—an active metal, an electrolyte based on sulfur dioxide, and a positive electrode which accumulates the active metal. During charging of the cell, ions of the active metal are released from the is electrode into the electrolyte solution and deposited onto the negative electrode. During the discharge process, the active metal deposited on the negative electrode dissolves and a corresponding amount of metal ions is accumulated in the positive electrode.

The term "$SO_2$-based electrolyte" designates those electrolyte solutions which contain $SO_2$ not only as an additive in small concentration, but for which the movability of the ions of the conducting salt providing the charge transport in the electrolyte, is at least partially effected by the $SO_2$.

Particularly important are cells in which the active metal of the negative electrode is an alkali metal, in particular lithium or sodium. In this case, the conducting salt is preferably a tetrachloraluminate of the alkaline metal, e.g. $LiAlCl_4$. Active metals preferred in the scope of the invention are, apart from lithium and sodium, also calcium and zinc.

Rechargeable electrochemical cells with an $SO_2$-based electrolyte have important advantages, whereby they seem advantageous for many applications for which rechargeable electrical energy sources are needed. In "The Handbook of Batteries" by David Linden, second edition 1994, Mc Graw Hill, on page 36.25, it is stated, for example, that cells with inorganic electrolytes based on $SO_2$ are attractive, as they can be operated with high charge and discharge currents due to the high ionic conductivity of the electrolyte. A high energy density, a low self-discharge rate, the possibility of a limited overcharge and exhaustive discharge, as well as a high cell voltage are mentioned as further advantages. Despite all these advantages they are, in the cited literature, considered as largely inappropriate for general use due to, inter alia, their potential safety risks.

Different types of the mentioned cells can be distinguished, the differences mainly relating to the positive electrode.

In a first group, carbon is used for the positive electrode, in form of a graphite material. The charge and discharge process in these cells involves a redox complex formation of the electrolyte salt (e.g. $LiALCl_4$) with the carbon.

In a second group, the positive electrode is based on a metal halide, for example $CuCl_2$, a simple electrode reaction taking place between the active metal and the electrode (see Handbook of Batteries, on the page mentioned above).

In a third group of cells, for which the invention is of particular interest, the positive electrode consists of a metal oxide, in particular in form of an intercalation compound. Such a cell with Lithium as active metal and a positive intercalation electrode on the basis of $LiCoO_2$ is the subject of the U.S. Pat. No. 5,213,914. Procedures for the production of appropriate intercalation electrodes are described in European patents 0357952 B1 and 0673552 B1. The content of these cited documents is incorporated herein by reference.

A problem which is common to the different types of cells with a $SO_2$-based electrolyte is the fact that a self discharge reaction takes place at the negative electrode during storage periods. By this reaction the sulfur dioxide of the electrolyte solution reacts with the active metal of the negative electrode to form a poorly soluble compound. In case of a monovalent active metal A, for example, a dithionite of the metal is formed according to the reaction equation:

$$2A + 2SO_2 \rightarrow A_2S_2O_4.$$

The poorly soluble product of this self discharge reaction is deposited onto the negative electrode as a covering layer.

This self discharge reaction consumes $SO_2$, which is then no longer available as solvent for the conducting salt. On the other hand, a sufficient amount of $SO_2$ is mandatory for the operation of the cell. If the $SO_2$-content would drop below a value sufficient for the movability of the conducting salt ions in the electrolyte, this would lead to an intolerable decrease of the electric conductivity. Therefore common electrochemical cells having an electrolyte which is based on sulfur dioxide, contain a large amount of $SO_2$.

In order to provide an improved electrochemical cell with a negative electrode, which in charged state contains an active metal selected from the group consisting of the alkaline metals, the alkaline-earth metals and the metals of the second subgroup of the periodic table of elements, an electrolyte solution based on sulfur dioxide, and a positive electrode containing the active metal, from where ions are released into the electrolyte solution during the charging process, whereas a self discharge reaction takes place at the negative electrode, during which the sulfur dioxide of the electrolyte solution is reacts with the active metal of the negative electrode to form a poorly soluble compound it is proposed that the electrochemical charge quantity of the sulfur dioxide in the cell, calculated with one faraday per mole sulfur dioxide, is smaller than the charge quantity of the active metal which can be theoretically electrochemically accumulated in the positive electrode.

The capacity of a cell of the type described here is determined by the amount of the active metal which can be accumulated in the positive electrode. In the discharged state of the cell, the active metal is contained in maximum concentration in the positive electrode, and it is released into the electrolyte solution during the charge process. A corresponding amount of the active metal is deposited onto or incorporated into the negative electrode.

For the above mentioned cells, for example, having a positive electrode of a metal halide, the accumulation process is a chemical reaction. In case of a metal oxide intercalation compound, the active metal is accumulated in the positive electrode by storing its ions in the matrix lattice of the metal oxide, or releasing them from the matrix lattice.

The quantity of electrical charge corresponding to the maximum amount of the active metal which the positive electrode may theoretically contain on the basis of stoichiometric calculations is designated the charge quantity of the active metal which can theoretically be accumulated in the positive electrode. This value of the accumulateable charge quantity is always higher than the practically obtainable maximum capacity of the cell, since—for practical reasons—with no type of positive electrode known so far the theoretically accumulateable quantity can be accumulated completely into the electrode, nor can it be released from the electrode during the charge process.

The formation of the poorly soluble self discharge product on the negative electrode consumes active metal. For the preferred case, in which the active metal is lithium, the self discharge reaction is, for example:

$$2Li + 2SO_2 \rightarrow Li_2S_2O_4.$$

In many cases, the cells are stored over a long period of time (several months or even years). Meanwhile the self discharge reaction continuously proceeds, whereby the active metal from the negative electrode reacts with the sulfur dioxide to form the poorly soluble product (in the exemplary case, lithium dithionit). The amount of $SO_2$ consumed thereby is equimolar to the amount of active metal converted at the negative electrode. For a completely charged cell, the maximum amount of the active metal on the negative electrode corresponds to the charge quantity theoretically accumulateable in the positive electrode. If the molar quantity of the sulfur dioxide in the cell is smaller than the electrochemically equivalent quantity of charge of the active metal theoretically accumulateable in the positive electrode, then finally, the entire amount of $SO_2$ of the electrolyte should be consumed in the course of the self discharge reaction. This would lead to the consequence that the electrolyte becomes solid, and thus, unusable. A permanent destruction of the cell would be the consequence. In order to avoid this risk, in the cells of the type discussed here so far amounts of sulfur dioxide were used, which were larger than the electrochemically equivalent charge amount of the active metal theoretically accumulateable in the positive electrode.

In the scope of the invention it was found, surprisingly, that in contrast to these considerations of a person skilled in the art, it is possible to work with a reduced amount of sulfur dioxide. This fact is hereinafter designated as the "$SO_2$ paradox". As the sulfur dioxide contributes a large share to the overall weight of the cell, it is possible to achieve a significant increase of the specific capacity (capacity per weight) of the cell, by reducing the $SO_2$ content.

Preferably, the electrochemical charge quantity of the sulfur dioxide is less than 80% of the electrochemically equivalent charge quantity of the active metal theoretically accumulateable in the positive electrode. Values of less than 60% are particularly preferred. The lower the $SO_2$ content is, the lighter is the cell at a given capacity. Cells according to this invention can even be produced with a charge quantity corresponding to less than 40%, and, particularly preferred, less than 20% of the theoretically accumulateable charge quantity.

The $SO_2$ paradox can, according to the current state of knowledge of the inventors, be explained by the fact that due to a further self discharge reaction a reaction product (e.g. $SO_2Cl_2$) is formed at the positive electrode which diffuses to the negative electrode and further reacts with the poorly soluble self discharge product formed there (e.g. $Li_2S_2O_4$), forming $SO_2$. This reaction, by which the poorly soluble products formed at the negative electrode by a self discharge reaction are dissolved due to a self discharge reaction at the positive electrode, with simultaneous formation of $SO_2$, is hereinafter designated "($SO_2$ forming) dissolving reaction".

The $SO_2$ forming dissolving reaction is so fast that it is in balance with the formation of self discharge products on the negative electrode ("formation reaction"). This is surprising taking into account the slow dissolution speed of the typically very poorly soluble self discharge product which forms the covering layer of the negative electrode. In other words: The poorly soluble covering layer on the negative electrode dissolves, as a result of the self discharge reaction taking place at the positive electrode, with the same speed as it is formed by the self discharge reaction at the negative electrode.

In order to improve this effect, appropriate constructive measures should be taken. In particular, it is advantageous to have the diffusion distance between the positive electrode and the negative electrode as short as possible. The resulting high concentration gradient increases the conversion rate.

Furthermore it is advantageous to use the subsequently explained preferred embodiments of the invention individually or in combination with each other.

In order to support the dissolving reaction, the positive electrode should have electron-conducting characteristics, i.e. it should contain an electron-conducting material. This means a material the electrical conduction of which is not based on the movement of ions, i.e., in particular, metallic conductors and semiconductors.

As already mentioned, the invention is of particular importance for cells having a positive electrode made is from a metal oxide, in particular a compound containing a transition metal M of the atomic number 22–28, and oxygen. Particularly preferred is an intercalation compound of an alkaline metal (as the active metal A of the cell), a transition metal M, and oxygen. Preferably, the alkaline metal is lithium. With respect to the metal M cobalt, nickel and iron are particularly preferred. Also binary and ternary metal oxide intercalation compounds, having two or three different transition metals in the lattice structure, as e.g. lithium-nickel-cobalt oxide (refer to U.S. Pat. No. 4,567,031) are of practical importance. As far as "a" transition metal is mentioned as the component of the intercalation compound, this does of course not mean that the compound contains only a single transition metal.

For the particularly preferred application case, the dissolving reaction was investigated in more detail. According to the current state of knowledge of the inventors, the following summarizing reaction equation can be given for the $SO_2$-forming dissolving reaction (which consists of various partial reactions) if a positive electrode containing $CoO_2$ is used:

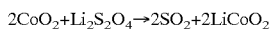

$$2CoO_2 + Li_2S_2O_4 \rightarrow 2SO_2 + 2LiCoO_2$$

The rechargeable cell of the invention, shows, in addition to the high specific capacity already mentioned, a high degree of operational safety. In particular, this refers to the risks mentioned before, which relate to the fact that a temperature increase causes exothermic reactions inside the cell which again result in a further rise of the temperature. This self-amplifying effect is, in the terminology of the experts in this field, also named "thermal runaway".

In practice, such safety problems may occur not only in case of a mechanical damage of the battery, but, under certain conditions, also during normal operation. A special problem in this context is the formation of dendrites during electrode charge; these dendrites may pierce the separator of the battery and cause a short circuit with the neighboring electrode. Internal short circuits can also be caused by electrochemically inactive components generated during the service life of the cells which form deposits (for example "dead lithium" on the negative electrode. Although these deposits are electrochemically inactive, they are chemically highly reactive and increase, during the charge process, the risk of a breakthrough of the separator, and thus, a short circuit in the cell.

Although battery manufacturers try since some time to control the charge/discharge circuit by electronic, mechanic or chemical means in such a manner that the current flow is interrupted below a critical temperature, the safety standard of the known cells is unsatisfactory.

In the scope of the invention it was found that the decreased $SO_2$ content leads to a substantial improvement of the operational safety. This can be explained by the fact that increased temperatures lead to the formation of gases from the $SO_2$, causing a pressure rise inside the cell; this safety risk is substantially reduced by the reduced $SO_2$ content according to the invention.

A further improvement of the operational safety can inexpensively be obtained, if an additional salt is included in the cell, at least in the range of the negative electrode, in addition to the conducting salt of the electrolyte. The additional salt can be present in is dissolved state. Preferably, however, a salt which is poorly soluble in the electrolyte is arranged in a concentration above its dissolubility in solid state in the range of the negative electrode. Conveniently, it is filled into the cell before filling it with the electrolyte liquid containing the conducting salt.

In order to achieve its positive effect, the preferably solid additional salt must be arranged "in the range" of the negative electrode in such a way, that it acts upon the exothermic reactions occurring in the immediate vicinity of the electrode surface during safety-critical situations. Preferably, this salt is an alkali metal halide, in particular, LiF, NaCl or LiCl. An immediate contact between the electrode and the salt is not absolutely necessary. It is, however, generally preferred if at least during a part of the charge/discharge cycle of the cell there is contact to the negative electrode, in particular to an active mass formed at the electrode.

Preferably, the additional salt should have a porous structure. In particular, this can be a granular filling or a body of salt particles adhered to each other (e.g. by sintering). Under certain circumstances, the porous structure of the salt can be provided by coating a porous carrier with salt in such a manner that its pores are not completely closed. The carrier body should be made of a chemically inert, rigid material, e.g. glass or oxide ceramics.

In particular with respect to the pore size, the porous structure should be formed and arranged in such a manner that the active mass which is formed at the negative electrode during the charge of the cell, penetrates into the pores of the porous salt structure. Thereby a large surface contact is obtained between the salt and those substances which can cause safety-critical conditions, or which may emit heat in case of a "thermal runaway".

Further details about the efficiency of an additional salt in the range of the electrodes of nonaqueous electrochemical cells can be taken from the international patent application PCT/DE 00/00177. Full reference is made to the explanations given therein both with respect to preferred embodiments and with respect to the obtained effects. As explained there in more detail, the effect of the additional salt is based, on one hand, on physicochemical effects (retardation of the access of reaction components and of the propagation of local heating; heat dissipation due to the melting heat necessary for melting a solid salt), and on the other hand, on chemical reactions.

Preferably, the added salt is a halide, whereas alkaline halides are preferred. In particular, LiF, NaCl and LiCl have proven appropriate.

In the scope of the present invention it was found that the addition of a further salt, in addition to the conducting salt, does not only provide the explained advantages with respect to safety, but beyond that leads to a substantial improvement of the function of electrochemical cells according to the invention.

This can be explained according to the current state of knowledge of the inventors, using the example Li|LiAlCl$_4$|LiCoO$_2$, as follows:

a) The following reaction sequence, in which sulphuryl chloride is formed from the tetrachloraluminate ions, takes place in the electrolyte at the positive electrode (during self-discharge as well as during cell overcharge):

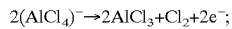
$2(AlCl_4)^- \rightarrow 2AlCl_3 + Cl_2 + 2e^-$;

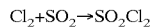
$Cl_2 + SO_2 \rightarrow SO_2Cl_2$ b) The formed sulphuryl chloride reacts with the covering layer on the negative electrode according to:

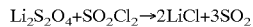
$Li_2S_2O_4 + SO_2Cl_2 \rightarrow 2LiCl + 3SO_2$ c) Additionally to this reaction sequence which is advantageous for the function of the cell, the following further reactions take place:

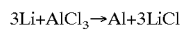
$3Li + AlCl_3 \rightarrow Al + 3LiCl$

$6Al + 3SO_2 \rightarrow Al_2S_3 + 2Al_2O_3$

This reaction sequence is irreversible and consumes SO$_2$. Therefore it affects the function of the cell.

d) Due to the presence of the additional salt in the range of the negative electrode the AlCl$_3$ which was formed according to a), and which participated in the reaction sequence c), is deactivated. According to the current state of knowledge, this may be due to reactions of the following type:

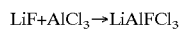
$LiF + AlCl_3 \rightarrow LiAlFCl_3$

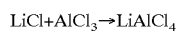
$LiCl + AlCl_3 \rightarrow LiAlCl_4$

These exemplary explanations can be summarized to the following: The addition of a further salt binds, and thus deactivates, corrosive agents which would cause, without the addition of a further salt, reactions consuming SO$_2$ in an irreversible way. With other words: The salt addition blocks reactions which compete with the "SO$_2$ forming dissolving reaction" and which would irreversibly consume SO$_2$.

In the scope of the invention it was found that the AlCl$_3$ formed during the reaction c) affects the function of the cell also by dissolving Li$_2$S$_2$O$_4$ molecules out of the covering layer of the negative electrode. With other words: The AlCl$_3$ removes Li$_2$S$_2$O$_4$ from the covering layer. As a result, the alkaline metal below (passivated by the covering layer) becomes reactive, and new Li$_2$S$_2$O$_4$ is formed while SO$_2$ is consumed. This interfering effect of the AlCl$_3$ is also strongly reduced by the addition of a further salt, and the function of the cell is substantially improved.

The cell according to the invention contains, as an alternative or in addition to the added salt, according to a further preferred embodiment, a compound containing a halogen, in particular aluminum fluoride (AlF$_3$) or boron fluoride (BF$_3$). For this preferred additional substance, the previous explanations with respect to the location (at least in the range of the negative electrode), to the aggregate state (preferably solid) and to the granular structure, are again applicable. According to the current state of knowledge of the inventors, the positive effect of such additions is caused by the fact that the halogen bound in such compounds has a similar effect as the halide ions of a corresponding salt.

The negative electrode preferably comprises a metallic substrate, for example made of a precision-expanded foil of nickel or cobalt. Particularly preferred, the metallic substrate is made of a metal foam, i.e. a highly porous, foamlike, metallic material. Commercial products which have proven their suitability for this purpose, have a porosity of about 90% to 95%. A separator layer can be applied directly to this foamlike substrate. This is obtained, according to a preferred embodiment, by applying a thin layer (for example, in form of a pasty mass) of a ceramic oxide material (in particular, aluminum oxide), which is afterwards heated under a protective atmosphere or in a vacuum.

However, other known types of negative electrodes can also be used, in particular an alloy of the active metal into which the active metal is absorbed during the charge process. According to a further known possibility the negative electrode comprises a matrix lattice, for example on carbon basis, into which the active metal is deposited, or from which it is removed, during the charge and discharge process, respectively, of the cell.

EXAMPLE 1

An electrochemical cell with the following characteristics was prepared:
Positive electrode: Intercalation electrode of 4 g $LiCoO_2$. The charge quantity theoretically accumulateable in this electrode is about 1.1 Ah.
Negative electrode: Carrier plate of nickel foam (manufacturer RETEC, USA). A separator was generated by applying aluminum oxide (in aqueous paste) and annealing under inert gas at 1,050° C.
Electrolyte: 3.3 g $LiAlCl_4$ in 2.4 g $SO_2$. Calculated with 1 faraday per mole, the $SO_2$ amount corresponds to a charge quantity of 1 Ah.

The cell was charged with 0.6 Ah up to 4.3 V. This corresponds to 60% of the theoretical capacity. Thereafter, it was stored for eight months. During storage, the conductivity of the electrolyte was monitored by means of electrochemical impedance spectroscopy. After the storage period, the remaining capacity as well as the general functionality of the cell were tested.

Although after eight months storage time only 20% of the initial charge capacity were available or, with other words, although 80% of the active metal had been consumed by self discharge reactions, only a small decrease of the electrolytic conductivity (20%) was noted after the storage period. After a new charge cycle up to 4.3 V, no substantial reduction of the cell capacity was found.

EXAMPLE 2

A second cell was prepared similar to example 1, with the following changes:
The positive electrode consisted of 6.7 g $LiNiO_2$. The charge quantity theoretically accumulateable in this electrode is about 1,84 Ah.
The electrolyte consisted of 3 g $LiAlCl_4$ in 2 g $SO_2$. Calculated with 1 faraday per mole, the amount of $SO_2$ corresponds to a charge quantity of 0.84 Ah.
The cell was charged and discharged several times between 3.0 V and 4.3 V. Each time it was charged to 1.0 Ah (corresponding to 55% of the theoretical capacity). After 20 cycles, it was stored for six months at a temperature of 20° C. Once again, the conductivity test did not show any substantial change after the storage time. After six months, the remaining capacity was 0.3 Ah. During a subsequent charge and discharge cycle, no substantial degradation of the nominal capacity and the interior resistance of the cell were detected. Even with the very low $SO_2$ content of this example, an unchanged, good function of the cell was obtained, while simultaneously the advantages related to the decreased $SO_2$ content were achieved.

EXAMPLE 3

A further cell was prepared according to example 1, with following changes:
Negative electrode: Carrier plate of precision-expanded nickel foil.
Salt addition: LiF powder with an average particle diameter of 220 μm was pasted onto the precision-expanded nickel foil of the negative electrode using an organic bonding agent.

This cell was charged according to example 1 and stored for eight months. The conductivity of the electrolyte solution stayed constant during the storage time.

After eight months, 40% of the initial cell capacity were still available. After a new charge and overcharge process with 4.3 V, no reduction of the cell capacity was found. In contrast to the cell of example 1, in which a slow, although low increase of the electrolyte resistance was detected after a large number of charge and discharge cycles, the electrolyte resistance of this cell remained constant even after 100 cycles.

The comparison to example 1 shows a significant improvement with respect to the irreversible change of the electrolyte conductivity. This effect of the salt addition becomes substantially more visible with increased temperature. A repetition of the examples 1 and 3 with a storage temperature increased to 50° C. lead to the result, that for a cell according to example 1 (without additional salt), the electrolyte conductivity, after eight months storage time and subsequent loading, decreased by 35%, whereas for a cell according to example 3, the electrolyte conductivity remained unchanged after the storage period.

EXAMPLE 4

An electrochemical cell with the following characteristics was prepared:
Positive electrode: 7 g $LiCoO_2$ (Merck SC10) were pressed into a nickel foam matrix (manufacturer RETEC, Type 2625-200T) with 200 mg ceramic bonding agent (COTRONICS, Type 792) and tempered at a temperature of 480° C. Charge quantity theoretically accumulateable in the cell: 1.9 Ah.
Negative electrode: Precision-expanded nickel foil (manufacturer Delker).
Electrolyte: 3.3 g $LiAlCl_4$ dissolved in 2.4 g $SO_2$. Calculated with 1 faraday per mole, the $SO_2$ amount corresponds to a charge amount of 1 Ah.
Salt addition: Filling of 1.5 g LiF powder with an average particle diameter of about 220 μm between negative electrode and separator.

The cell was repeatedly galvanostatically cyclized is between 3.5 and 4.4 V, and subsequently charged with 1 Ah to 4.3 V. Thereafter, it was stored for 80 days at ambient temperature. During the subsequent discharge process, there were still 0.6 Ah discharge capacity available.

The cell was cyclized in follow-up cycles with the charge-discharge capacities observed in the first cycle (with the same charge/discharge currents). It remained completely operable for more than 200 cycles.

What is claimed is:
1. Rechargeable electrochemical cell, comprising
a negative electrode, which in the charged state contains an active metal selected from the group consisting of the alkaline metals, the alkaline-earth metals and the metals of the second subgroup of the periodic system, namely zinc, cadmium, and mercury;

an electrolyte solution based on sulfur dioxide; and a positive electrode which contains the active metal and from where ions are released into the electrolyte solution during the charging process, wherein a self discharge reaction takes place at the negative electrode, by which the sulfur dioxide of the electrolyte solution reacts with the active metal of the negative electrode to form a poorly soluble compound, characterized in that the quantity of the electrochemical charge of the sulfur dioxide in the cell, calculated with one faraday per mole sulfur dioxide, is smaller than the quantity of the charge of the active metal which can be theoretically electrochemically accumulated in the positive electrode.

2. Cell according to claim 1, characterized in that the quantity of the electrochemical charge of the sulfur dioxide is less than 80%, preferably less than 60%, particularly preferred less than 40%, and, even more preferably less than 20% of the quantity of the charge of the active metal that can be theoretically electrochemically accumulated in the positive electrode.

3. Cell according to claim 1, characterized in that it contains, at least in the range of the negative electrode, a further salt in addition to conducting salt of the electrolyte.

4. Cell according to claim 3, characterized in that the further salt is a halide, in particular an alkaline halide, in particular LiF, NaCl or LiCl.

5. Cell according to claim 4, characterized in that the further salt is a mixture of LiCl and at least one other alkaline halide, in particular LiF.

6. Cell according to claim 1, characterized in that it contains at least in the range of the negative electrode a compound containing a halogen.

7. Cell according to claim 3, characterized in that the further salt and/or the compound containing a halogen, is present in solid state in porous structure, in particular as a granular filling or as a body of bonded particles.

8. Cell according to claim 7, characterized in that the porous structure is adapted and arranged to be in contact, at least during a part of the charge/discharge cycle, to an active mass formed at the negative electrode.

9. Cell according to claim 1, characterized in that the negative electrode comprises a metallic substrate onto which the active metal is deposited during the charging of the cell.

10. Cell according to claim 1, characterized in that the negative electrode comprises an alloy of the active metal, with the active metal being absorbed into the alloy, or into the matrix lattice, respectively, during the charging of the cell.

11. Cell according to claim 1, characterized in that the positive electrode comprises an electron-conducting material.

12. Cell according to claim 1, characterized in that the positive electrode comprises a metal oxide.

13. Cell according to claim 1, characterized in that the positive electrode comprises an intercalation compound.

14. Cell according to claim 1, characterized in that the active metal is lithium, sodium, calcium, or zinc.

* * * * *